United States Patent [19]

Stencil

[11] 4,445,460

[45] May 1, 1984

[54] CROWD GATE FOR MILKING PARLOR

[76] Inventor: Gerald R. Stencil, Rte. 3, Denmark, Wis. 54208

[21] Appl. No.: 253,310

[22] Filed: Apr. 13, 1981

[51] Int. Cl.$^3$ ............................................. A01K 29/00
[52] U.S. Cl. ........................................ 119/20; 119/82
[58] Field of Search ................... 119/20, 14.03, 14.04, 119/82

[56] References Cited

U.S. PATENT DOCUMENTS

| | | | |
|---|---|---|---|
| 3,799,115 | 3/1974 | Fullerton et al. | 119/20 |
| 3,805,741 | 4/1974 | Thompson et al. | 119/20 |
| 3,908,599 | 9/1975 | Floechini | 119/20 |
| 3,921,586 | 11/1975 | Sweeney et al. | 119/20 |

Primary Examiner—Hugh R. Chamblee
Attorney, Agent, or Firm—Recka & Joannes

[57] ABSTRACT

A crowd gate for use in herding animals from an entry end of a holding area to the exit end of a holding area of the type in which a wheeled carriage, from which a pivoting gate is suspended into and generally spans the holding area, is moved along tracks above the holding area, the suspended gate herding the animals in the area before it, such gate being responsive to animal contact to stop movement of the carriage, such gate being used in association with gate raising means operative to raise the gate to a horizontal position for return of the carriage to the entry end of the herding area over the heads of incoming animals wherein the improvement comprises a substantially counterbalanced pivoting, spring biased gate mounted so that it hangs forwardly in the direction the animals are to be herded rather than normal to the floor of the holding area, the first contact of the gate thereby being an edge contact of the gate with the legs of the animals being herded, the resistance to pivoting of the gate acting as goading means, together with a simple mechanical means for raising and securing the counterbalanced gate in a horizontal position during return of such carriage to the point of beginning; such mechanical means including gate raising slides mounted on the rear of the gate, stationary rollers operative to contact the gate raising slides on rearward travel of the carriage thereby urging the gate into a horizontal position where the gate is secured by strikers mounted on the carriage and the gate is thereafter lowered to goading position at the entrance end of the holding area so a further herding cycle can be effected.

8 Claims, 8 Drawing Figures

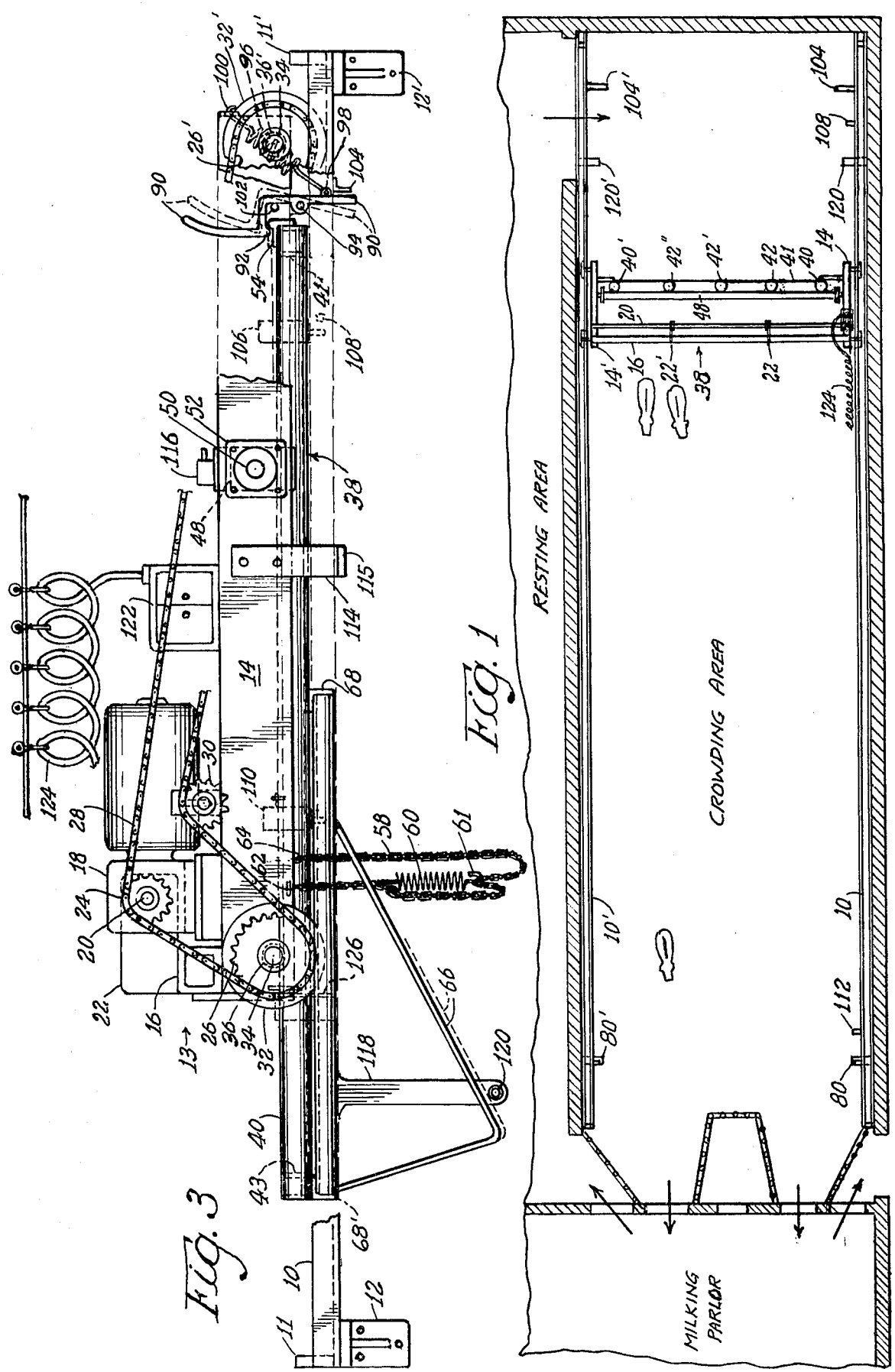

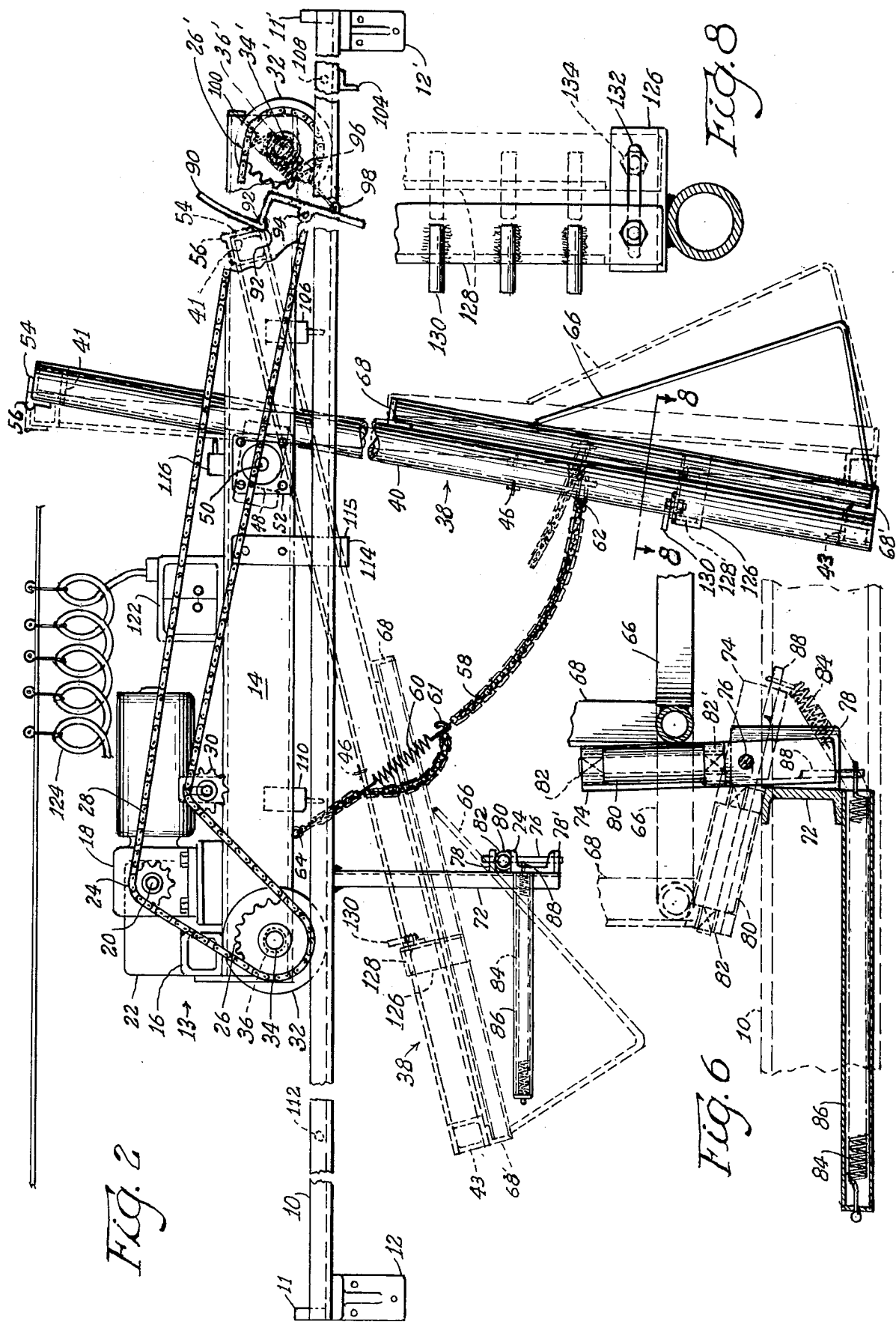

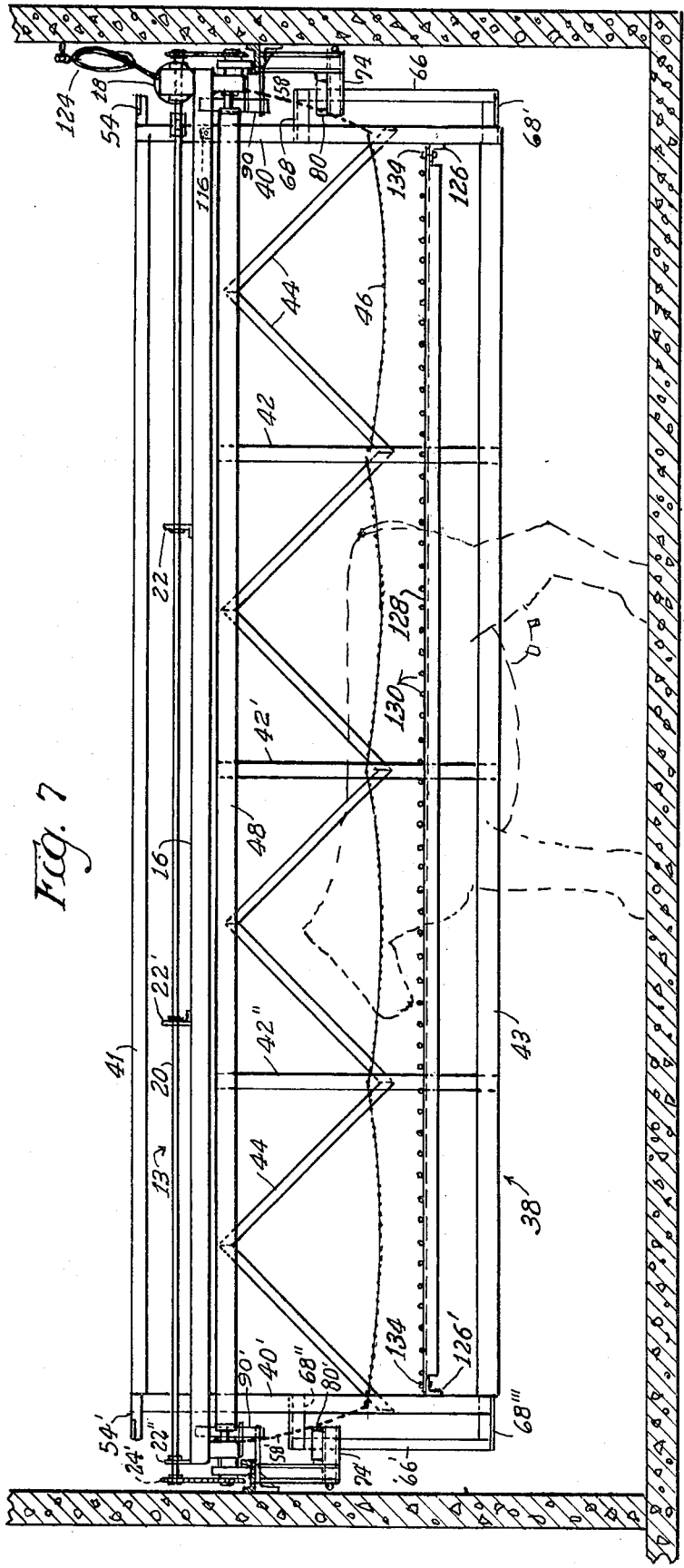

CROWD GATE FOR MILKING PARLOR

BACKGROUND OF THE INVENTION

1. Field of the Invention

This invention relates to automated crowd gates for use in herding cattle from an entrance of a cattle holding area, through the area and into a milking parlor.

2. Description of the Prior Art

The most pertinent prior art known to applcant includes U.S. Pat. No. 3,921,586 and U.S. Pat. No. 3,805,741.

The devices comprise a gate suspended from an overhead carriage. As the carriage moves above a cattle holding area the cattle are forced through the area by the suspended gate which sweeps through the area forcing cattle before it.

A cable system is used to raise the gate after its pass through the area in one device, in others a hydraulic system or auxiliary electrical motor system is used.

The gate has means associated with it to stop the carriage when the gate contacts a balky animal. Upon completion of the sweep through the holding area the gate is raised to a horizontal position to allow it to pass over the head of incoming cattle, the carriage is then returned to the beginning position and the gate lowered to begin a new sweep through the holding area.

The systems used are complex and often require associated hydraulic systems for gate raising. Failure of the hydraulic system can drop the gate from its raised horizontal position on to cattle below injuring them.

Further in sweeping through the holding area the gates impinge on the rump of the cattle. A balky cow rather than moving forward when contacted by the gate may resist and may apply force on the gate that derails the device or even throws the carriage off the tracks and into the holding area.

SUMMARY OF THE INVENTION

It is the object of the invention to provide a crowd gate that can be installed in an area where the only source of power is electricity, all switches being mounted on the device itself. The device requires simply a pair of parallel overhead tracks on which is mounted a self contained carriage and a trolley mounted power supply.

The gate is partially counterweighted and hung off center so that its leading edge is biased forwardly in the direction the cattle are to be herded. The lower edge of the gate contacts the sensitive backs of the herded cattles legs. Prior art uses the mass of the gate for goading.

Goading of a reluctant animal is provided by springs and goading bars rather than by the weight of the gate. As the gate is swung into a position normal to floor of the holding area, from the gates normally forward biased hang by impinging on a reluctant or balky animal, goading force progressively increases until the power to the carriage is shut off by the pivoting gates contact with a limit switch.

The problem of dealing with a single balky animal is addressed by the device. All the force of the gate is put on a single balky animal. When a group of animals is contacted by the gate the goading force is slight on any one animal.

The use of a counterbalanced gate in association with springs to provide the goading force allows a simple mechanical gate raising means. In this device a pair of spring mounted rollers free to swing out of the way of the gate on forward travel, and stationary on return travel, force the gate into a horizontal position where the gate is held until the carriage reaches the point of beginning where the gate is lowered for another sweep through the area.

It is an object of the invention to provide a crowd gate wherein all limit switches and electrical operating components are mounted on the carriage.

It is an object of the invention to provide a simpler and more effective crowd gate eliminating the need for auxiliary gate raising means such as hydraulic cylinders.

It is an object of the invention to provide a more effective goading means to provide progressively increasing force to a single balky animal.

DESCRIPTION OF THE DRAWINGS

FIG. 1 Plan view of a typical crowd gate installation, the arrows showing the path of travel of cattle from resting area through crowding area, to milking parlor and return.

FIG. 2 Side view of the crowding device, particularly showing the forward bias of the crowding gate and its suspension.

FIG. 3 Side view showing the crowding gate in lifted position and, in dotted line, in its "just released" position preparatory to lowering the gate for a new crowding cycle.

FIG. 6 Section taken on line 6—6 of FIG. 5, showing the operation of the spring biased gate raising slide being pushed out of the way of the forward moving gate.

FIG. 7 Front view of the entire device, particularly showing its relationship to the cattle, the forward edge of the gate contacting the leg of the cow therein.

FIG. 8 Section taken on line 8—8 of FIG. 6 showing the adjustable training bar.

DETAILED DESCRIPTION OF INVENTION

Figure 4:
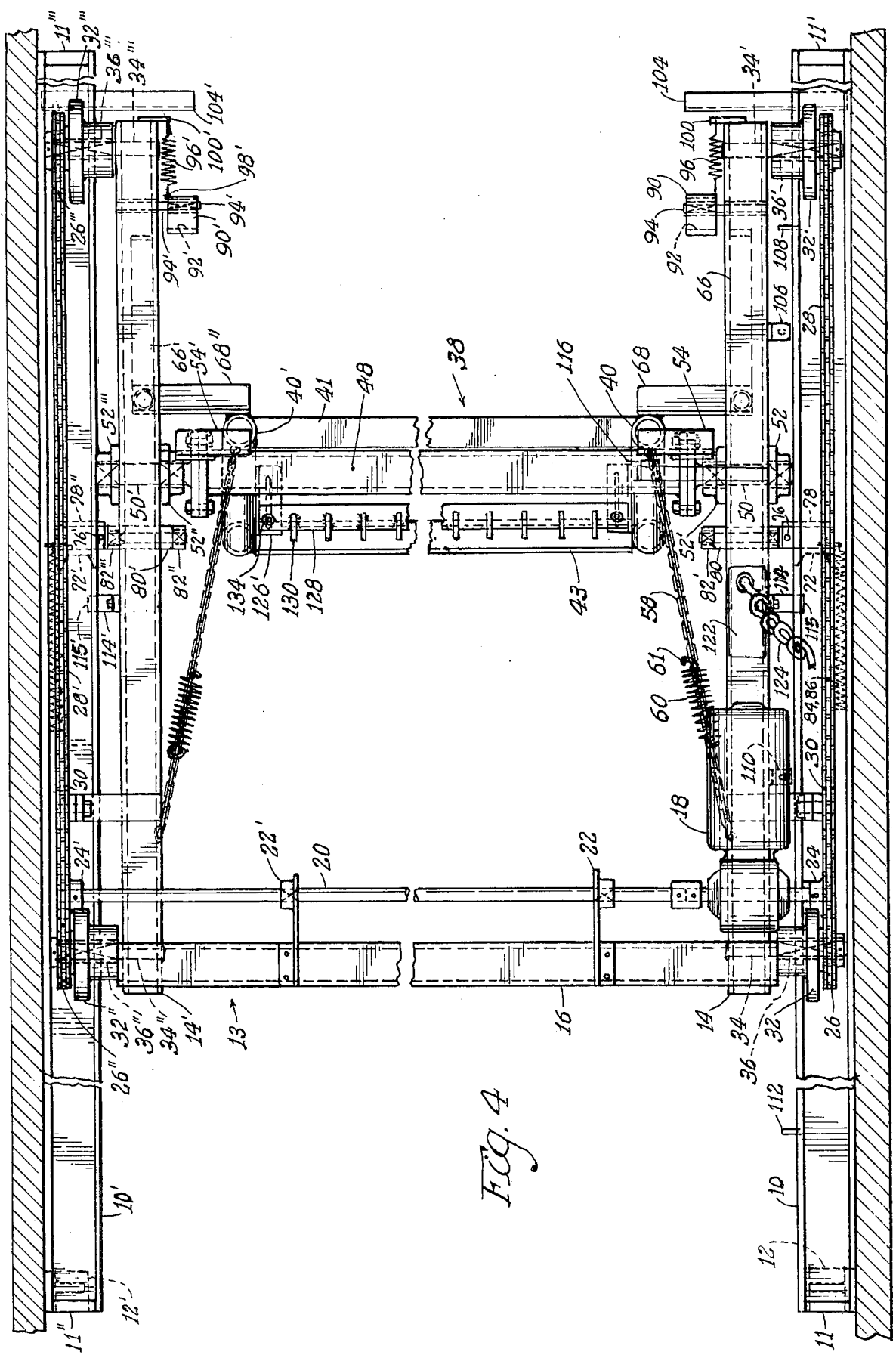
FIG. 4 Plan view of the device specifically showing the drive means.

In the embodiment shown parallel tracks 10 and 10' are fastened along the sides of the proposed crowding area. In FIGS. 2 and 4, the tracks 10 and 10' are shown attached to a wall by track mounting brackets 12, 12' 12" and 12'".

In an open area the tracks may be mounted on posts and the sides of the crowding area formed by fencing.

Figure 5:
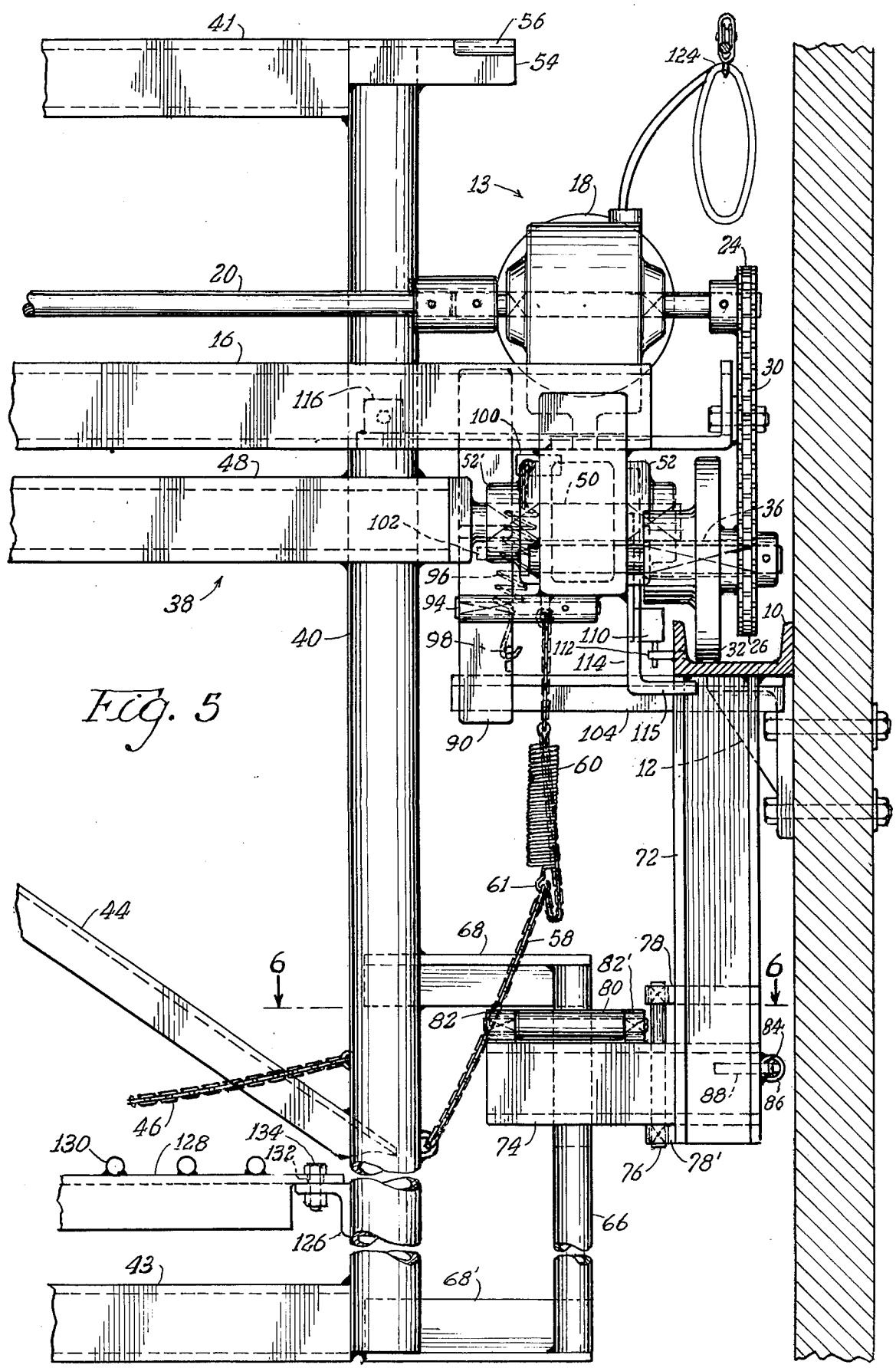
FIG. 5 Front view of the motor end of the device showing the drive means in more detail.

The tracks are trough shaped as shown in FIG. 5.

Self propelled carriage 13 is mounted on tracks 10 and 10' with the crowd gate 38, hanging below the carriage 13, forming the third side of the crowding area. In operation the carriage 13 with its downward hanging crowd gate 38 moves toward the milking parlor forcing the animals to move ahead of the gate.

Traction wheels 32, 32', 32" and 32'" of the carriage 13 are placed in the troughs of tracks 10 and 10'. The carriage 13 moves back and forth on these wheels along the tracks.

Traction wheels 32, 32', 32" and 32'" are mounted on the four corners of the carriage by means of studs 34, 34', 34" and 34'" welded to side frames 14 and 14' of carriage 13. Pressed to such studs 34, 34', 34" and 34'" are common bearings 36, 36', 36" and 36'". Driven sprockets 26, 26', 26" and 26'" are fixedly attached to the traction wheels. The side frames 14 and 14' are tied together by cross strut 16.

Carriage 13 is self contained. Except for a source of power, and restarting means in the parlor, all means necessary to move the gate back and forth, stop it and start, and raise and lower the gate are carried on Carriage 13.

A conventional electric motor is mounted on the carriage 13 which engages Motor Reducer Power Unit 18.

The motor reducer power unit 18 receives power via conventional trolley mounted, extensible cable 124. All power to operate the device comes through such cable. Starter box 122 contains all of the electrical switching elements.

Power unit 18 is drivably connected to double extended drive shaft 20. Drive shaft 20 drives gears mounted on each side of the carrage 13. The drive shaft 20 is supported by intermediate drive shaft bearings 22 and 22' which themselves are supported by supports extending from cross strut 16.

The support reduces sag of the long drive shaft.

Drive sprocket 24 is secured at one end of drive shaft 20 and drive sprocket 24' is secured at the other end. Drive sprocket 24 is secured to and drives sprockets 26" and 16''', turning attached traction wheels 32, 32', 32" and 32''' via drive chains 28 and 28'. Take up sprockets or idlers 30 and 30' are adapted to ensure proper chain tension.

The carriage can be driven with one driving wheel at one side of the carriage or two driving wheels, one on each side of the carriage. Four wheel drive as shown however, provides better operation in field use, where tracks may be uneven, loads across the face of the gate may vary depending on animal contact and debris may build up in the tracks.

At each end of tracks 10 and 10' are carriage safety stops 11, 11', 11" and 11''' provided to prevent derailment of the carriage 13 in case of failure of normal arresting of carriage travel.

Pivotally connected to the carriage 13 and suspended therefrom is crowding gate 38.

The crowding gate 38 comprises end members 40 and 40' which are steel tubing or pipe, intermediate member 42, 42' and 42" also made of tubing or pipe. The other parts are the upper cross member 41, lower cross member 43, braces 44, mounting beam 48, mounting trunnions 50, 50' and slide mounting brackets 68, 68', 68" and 68'''.

The trunnions 50 and 50' are pivotally mounted to carriage side frames 14, and 14' by means of flange bearings 52, 52', 52", and 52''' which are fastened to each of the side frames 14, and 14'.

The crowding gate 38 is not hung directly on the mounting beam. End members 40 and 40' and intermediate member 42, 42' and 42" are fastened to one side of mounting beam 48. This causes the gate 38 to hang at an angle as shown in FIG. 2 of the drawings.

This slanted or angular hang is in the direction of forward travel of the device. The hang brings the lower cross member to bear upon the back of the legs of the animal. Contact at the level of the animals legs has been found to goad the animals forward more effectively and to be less likely to injure them or to cause the cattle to fight the gate. Contact at this height is also least likely to involve gate entanglement by kicking or rearing animals.

Safety chains 46 and 46' are provided to prevent the animal from pushing the gate back and up, thereby preventing escape or entanglement.

Carriage motion forward, against a resisting animal, increases the goading action due to the effort required to swing the gate 38 towards vertical. Further as gate 38 approaches vertical due to resistance of the animal, chain 46 comes to bear on the animal to effect further goading effort.

Also mounted on end members 40 and 40' are fastened brackets 126 and 126' for mounting of training bar 128. Training bar 128 carries a multiplicity of trainer pins or goads 130.

Training bar 128 can be moved to a position where no contact is made with the animals by sliding the bar back on mounting brackets 126 and 126', by means of adjusting bolt 134 moving in adjusting slot 132.

The purpose is to provide at the option of the user more goading action when needed with recalcitrant animals.

The contact ends of goads 130 are blunt and smooth so as to irritate but not injure the animals.

Adding of weight to upper cross member 41 increases the angle of hang of gate 38 and increases the goading effect. Upper cross member 41 also acts as a counterweight on gate 38. By varying the weight only a small amount of force is necessary to pivot and to raise the gate to a horizontal position.

Care must be taken that the crowding action be immediately halted upon the sensing of too-great resistance by the animals as when they are being already well-crowded; or when a single stubborn animal may simply refuse to budge. In either case, further crowding could cause injury.

A safety limit switch 116 is provided to cut power when the gate 38 approaches vertical.

To prevent gate 38 from rocking or being pushed back to any more than a vertical position, limiting chains 58 and 58' are provided, secured at 62, 62' to gate members 40, 40' and at 64, 64' to carriage side frame 14, 14'.

Limiting chains 58, 58' have a secondary function—to provide an added goading action just prior to the cutting-off of power to the carriage 13.

Cushion springs 60, 60' are attached to limiting chains 58, 58' one end of each spring mounted solidly to its respective chain, the other end of each spring terminating in hooks 61, 61' which may be engaged with any of the links in the chain 58, 58'; so to gather up more or less of chains 58, 58' and so bring the gate 38 up more or less from its normal hang, thus to provide a slightly earlier goading engagement with the animals but mainly to provide an increased, spring-induced goading action during the last several inches of gate swing just prior to power cut off by safety limit switch 116. Thus, an additional amount of final, yet safe, goading may be brought to bear upon the animals at exactly the time they require it most—when refusing to budge.

Re-activation of carriage 13 from the remote milking parlor is only possible after the animals themselves have released the force on the safety limit switch 116 by moving away from the gate 38 and allowing it to return to its suspended position.

As a further safety precaution, in case an animal gets under the gate and rears up, safety angles 114 and 114' are secured to carriage side frames 14 and 14' with short legs 115 and 115' underlying tracks 10 and 10'. This prevents derailment of the carriage 13.

After the carriage 13 with its suspended gate has made its complete pass through the crowding area it is desireable to raise the gate to a horizontal position, so as to travel over the heads of incoming cattle on the return of the carriage to the starting point.

Devices such as cables, chains and hydraulic or air operated cylinders have been used in crowd gates to raise the suspended gate to a vertical position.

In this device raising is done mechanically. This is made possible by using counterweights mounted on the gate above the axis of rotation.

The raising mechanism is shown in FIG. 6.

The raising mechanism comprises a pair of hinged spring mounted rollers 80 and 80' and a pair of gate raising slides or cams 66 and 66', mounted on the back of the gate, covered in more detail hereinafter. The rollers swing out of the way of the crowd gate as it makes a forward sweep through the holding area. As the carriage 13 with its suspended gate moves back to the point of beginning, the rollers are no longer free to swing out of the way and the gate 38 rides up on the rollers into horizontal position where it is held and locked for its return travel to the starting point of another cycle.

In detail, gate 38 has mounted on the back of the gate, gate raising slides 66 and 66', which ride up gate raising rollers 80 and 80' as the direction of travel of the carriage with its suspended gate is reversed; as the carriage moves back to the point of beginning the gate pivots about trunnions 50 and 50' raising the gate until the gate assumes a substantially horizontal position as best seen in FIG. 3 of the drawings.

Gate raising slides 66 and 66' are attached to gate 38 by means of brackets 68, 68', 68" and 68'".

As the gate is elevated into a horizontal position, pivotally mounted latching strikers 54 and 54' lock on to and hold the gate in the horizontal position, and securely holds the gate above the cattle through the carriages rearward travel to the point of beginning. The latching strikers 54 and 54' are secured to the tops of end members 40 and 40'. The latches 90 and 90' are pivotally mounted on carriage side frames 14 and 14' by means of pivot pints 94 and 94'. The latches are spring biased by springs 96 and 96' in a vertical position as shown in solid line in FIG. 3, the latches are limited against overtravel by limit pins 102 and 102'; The latch biasing springs 96 and 96' are anchored to carriage frames 14 and 14' at points 100 and 100' and to latches 90 and 90' at points 98 and 98'. The latching action is best seen in FIG. 2 of the drawings.

Safety lips 56 and 56' on gate latching strikers 54 and 54' engage safety lips 92 and 92' of gate latches 90 and 90' to prevent untimely disengagement during travel.

Returning to the raising mechanism; during forward travel of the gate, both the gate and gate raising slide 66 and 66' must move past gate raising slide rollers 80 and 80'; to accomplish this the rollers 80 and 80' are mounted on swing brackets 74 and 74'. The rollers themselves are mounted on bearings 82, 82', 82" and 82'". The swing brackets 74 and 74' are pivotally mounted by means of pivot pins 76 and 76' to solid brackets 78, 78', 78" and 78'" which are fastened to depending mounting brackets 72 and 72'.

The swing brackets 74 and 74' are spring biased so as to swing out of the way of the crowd gate as the gate moves forward. The swing brackets 74 and 74' with their attached gate raising slide rollers 80 and 80' are pulled back into the gate raising position after forward passage of the gate by biasing springs 84 and 84'. The springs operate in sleeves 86 and 86' are secured to swing brackets 74 and 74' by anchor pins 88 and 88'.

Returning to the now horizontal gate; the gate is horizontal and is latched to the carriage and is carried back to the starting position over the incoming animals. This is best seen in FIG. 3 of the drawings.

At the starting point the gate is lowered to a vertical position while supported by gate lowering rollers. In more detail, gate 38 is unlatched by latches 90 and 90' striking release strikers 104 and 104'. With the release of the latches gate 38 pivots down and slides 66 and 66' come in contact with gate lowering rollers 120 and 120' which are attached to brackets 118 and 118'.

As the carriage 13 proceeds into a new crowding run, slides 66 and 66' slide on rollers 120 and 120' smoothly lowering the gate into position for a new herding cycle.

The carriage 13 is prevented from over running the starting end by limit switch 106 co-operating with limit switch striker 108. This cuts power to the carriage 13. At the other end of the track limit switch 110 co-operating with limit switch striker 112 cuts power to carriage 13 to prevent over-running at the milking parlor end.

I claim:

1. A crowd gate for use in herding animals from an entry end of a holding area to the exit end of a holding area, said crowd gate comprising:
   parallel overhead tracks extending from end to end of a holding area:
   a wheeled carriage extending between and riding on said tracks;
   a motor mounted on said carriage and energizable to drive said carriage from the entrance end to the exit end of the holding area and return;
   a gate pivotally attached to said carriage and depending therefrom; said gate being biased so as to hang with the lower edge of the gate being substantially in front of an imaginary line passing through the pivotal attachment and normal to the walkway;
   said gate being adapted to engage an animal on the walkway with the forward edge of said gate; at the backs of the legs of the animal and thereby to goad the animal forward;
   goading means comprising spring biasing means operative to increase the goading effect of the gate on a recalcitrant herder animal on the walkway as such gate engages such an animal and is forced into a vertical hang
   means for pivoting said gate to a substantially horizontal position so that gate may pass over an animal on the walkway, on the return of said carriage to the entrance end of the walkway;
   means for controling said motor including animal sensing means associated with said gate.

2. Apparatus according to claim 1 further including goading means comprising a trainer bar mounted on such gate with goads slidably mounted thereon.

3. Apparatus according to claim 1 wherein said means for pivoting said gate comprises:
   a counterweight mounted on said gate, above the point of attachment of said gate to the carriage, such weight being less than the weight of that part of the gate hanging below the point of attachment;
   a pair of slides mounted on the back of said gate;
   a pair of spring biased rollers mounted at the exit end of the walkway, such biasing being operative to swing said rollers out of the way of the forward moving gate and to engage the slides upon return travel of the carriage and the depending gate urging the gate into a horizontal position as the carriage moves to the entrance end of the holding area;

gate latching means operative to latch and to secure the gate in a vertical position during travel of the carriage to the entrance end of the holding area.

4. A crowd gate means for use in herding animals from an entry end of a holding area to the exit end of a holding area of the type in which a wheeled carriage, from which a pivoting gate is suspended into and generally spans the holding area, is moved along tracks above the holding area, the suspended gate herding the animals in the area before it, such gate being responsive to animal contact to stop movement of the carriage, such gate being adapted and used in association with gate raising means to raise the gate to a horizontal position for return of the carriage to the entry end of the herding area wherein the improvement comprises:

a gate mounting beam substantially spanning the holding area and pivotally mounted to the carriage;

a partially counterweighted gate, fixedly mounted to the gate mounting beam other than at the center of mass of the gate mounting beam and on that side of beam opposite of the direction of forward travel of the carriage so that the lower edge of gate extends forward of an imaginary line normal to the floor of the holding area and passing through the center of mass of the gate mounting beam.

5. Apparatus as claimed in claim 4 further comprising:

gate limit chains fixedly attached to the gate and fixedly attached to the carriage at a position in front of the gate so as to limit the rearward pivoting of the gate.

6. Apparatus as claimed in claim 4 further comprising:

gate limiting chain cushion springs removably attached between and spanning links of the gate limit chain gathering up the same; said springs being operative to adjust the angle of hang of the gate and to give increased goading as the suspended gate is pivoted back into a vertical position by a stationary animal.

7. Apparatus as claimed in claim 6 further comprising:

a training bar having mounted thereon a plurality of goads slidably mounted on the gate, such training bar being adjustable for contact with an animal to be herded.

8. Apparatus as claimed in claim 4 wherein the gate raising means comprises:

gate raising slides mounted on the back of the gate;

gate raising rollers mounted at the exit end of the holding area engaging such slides and operative on movement of the carriage towards the point of beginning and thereby to urge the gate into a horizontal position;

gate latching strikers operative to retain the gate in a horizontal position as the carriage returns to the point of beginning of the herding cycle;

gate release strikers operative to release the gate at the point of beginning.

* * * * *